252-99 AU 166 EX

10/14/80 XR 4,228,048

United States Patent [19]

Tesdahl

[11] 4,228,048

[45] Oct. 14, 1980

[54] FOAM CLEANER FOR FOOD PLANTS

[75] Inventor: Thomas C. Tesdahl, Cincinnati, Ohio

[73] Assignee: Chemed Corporation, Cincinnati, Ohio

[21] Appl. No.: 42,657

[22] Filed: May 25, 1979

[51] Int. Cl.[3] .......... C08L 5/00

[52] U.S. Cl. .......... 260/17.4 UC; 252/99; 252/135; 252/156; 252/174.25; 134/40; 252/535; 252/554; 252/DIG. 2; 252/DIG. 3; 252/DIG. 11; 260/17.45 G

[58] Field of Search .......... 260/17.4 UC

[56] References Cited

U.S. PATENT DOCUMENTS

| | | | |
|---|---|---|---|
| 2,034,361 | 3/1936 | Sutton | 252/99 |
| 2,798,053 | 7/1957 | Brown | 260/17.4 UC |
| 3,627,686 | 12/1971 | Sabatelli et al. | 252/99 |
| 3,884,826 | 5/1975 | Phares et al. | 252/174.25 |
| 3,941,710 | 3/1976 | Gilbert et al. | 252/99 |
| 3,945,951 | 3/1976 | Arai et al. | 252/554 |
| 4,005,027 | 1/1977 | Hartman | 252/99 |
| 4,051,055 | 9/1977 | Trinh et al. | 252/99 |
| 4,083,795 | 4/1978 | Joubert | 252/99 |
| 4,122,025 | 10/1978 | Kiewert et al. | 252/173 |
| 4,123,377 | 10/1978 | Davey et al. | 252/99 |
| 4,140,656 | 2/1979 | Mast | 252/545 |

OTHER PUBLICATIONS

Soap and Chemical Specialties, "Built Nonionic Liquid Detergents", Fordyce et al., pp. 59-62.

Chem. Absts. 69: 44746b, Low-Density Dry Detergent Mixtures, Krusius et al.

Chem. Absts. 74: 14424f, Cleansing Suspensions, Hudson et al.

*Primary Examiner*—Edward M. Woodberry

*Attorney, Agent, or Firm*—Charles L. Harness

[57] ABSTRACT

Liquid cleaning and bleaching concentrate which generates copious foam on dilution with water in a mechanical foam generator. Contains modified polyacrylic acid salt, sodium tripolyphosphate, sodium hydroxide, sodium silicate, sodium hypochlorite sodium alkane sulfonate, and (optionally) sodium polyacrylate.

4 Claims, No Drawings

FOAM CLEANER FOR FOOD PLANTS

This invention is directed to a liquid alkaline concentrate which generates copious foam on dilution with air and water in a mechanical foam generator. It is of particular utility in cleaning food plants. The invention provides a unique combination of all the necessary cleaning adjuncts for foam cleaning in a single stable liquid package. A 1 to 40 dilution provides a stable foam media with the necessary chlorine, alkalinity, and metal safety to satisfactorily foam clean food contact surface when used according to present accepted technology.

Storage tests have shown both of the products (A and B) of the Preferred Formulations in the Table to be storage stable at 105° F. for 2–4 weeks and at 75° F. for two months.

EXAMPLE 1

The concentrate was prepared as follows. The ingredients as given in Column 1-A of the Table were added in order to a kettle equipped with a jacket capable of heating and cooling and a mixer capable of running at a minimum of 150 rpm. Sufficient ingredients were used to make a 1000 pound mix. The water was added first, at 50°–80° F. Next the modified polyacrylic acid was added, using a funnel disperser. This component was added slowly to avoid lumping. It was admixed into the water with high agitation until dissolved. A portion of the liquid caustic soda charge was added next and mixed for ten minutes. When the sodium polyacrylate is incorporated in the formula, it is added at this point and stirred for ten minutes. The powdered polyphosphate is next added slowly to the kettle and mixed for two hours or until completely dissolved. The balance of the liquid caustic soda charge is added at this point and stirred for ten minutes. At this point, n-alkane sulfonate is blended slowly forming an opaque emulsion. The temperature of the mixture is generally around 110° F., but if higher, the mixture is cooled to 110° F. before the chilled sodium hypochlorite solution is added to the mixture. Finally, the mixture is blended thoroughly for an hour.

TABLE

| MATERIALS | PREFERRED FORMULATION A-wt. % | PREFERRED FORMULATION B-wt. % | PREFERRED BROAD RANGE Wt. % | PREFERRED NARROW RANGE Wt. % |
|---|---|---|---|---|
| Water | 56.9 | 51.0 | 8.5–97.45 | 50.6–80.2 |
| Modified polyacrylic acid thickening agent[1] | 0.7 | 0.6 | 0.05–2.0 | 0.3–1.2 |
| Polyphosphate | 8.0 | 10.0 | 2–16 | 4–12 |
| Sodium Hydroxide, 50% aqueous 13.0 solution | 13.0 | 0.2–25.0 | 5–20 | |
| Sodium silicate 1:3.22 $Na_2O/SiO_2$ aqueous solution | 12.0 | 12.0 | 0.2–25.0 | 5–20 |
| Sodium Hypochlorite | 1.4 | 1.4 | .05–5.0 | 0.5–3.0 |
| $C_{13}$—$C_{18}$ n-Alkane Sulfonate, sodium salt, 60% aqueous solution | 8.0 | 8.0 | 0.05–15 | 5–12 |
| Sodium Polyacrylate, 20% aqueous solution | — | 4.0 | 0–10.0 | 0–6 |

[1]The thickening agent as broadly defined and as covered in "Preferred Broad Range" is dispersible cross-linked interpolymer of a monomeric mixture comprising a monomeric polymerizable alpha-beta monoolefinically unsaturated lower aliphatic carboxylic acid, and a polyether of a polyol selected from the class consisting of oligo saccharides, reduced derivatives thereof in which the carbonyl group is converted to an alcohol group, and pentaerythritol, the hydroxyl groups of said polyol which are modified being etherified with allyl groups, said polyol having at least two allyl ether groups per polyol molecule. As defined and covered in "Preferred Narrow Range" it is within the aforesaid definition, and further it is made by co-polymerizing about 98–99.5 parts by weight of aforesaid definition, and further it is made by co-polymerizing about 98–99.5 parts by weight of acrylic acid with about 0.5–2.0 parts of polyallyl polyether of sucrose having about 2–8 allyl groups per molecule. As defined and covered in "Preferred Formulation" it is within the aforesaid definition and within the preceding statement of preparation, and further, it is made by co-polymerizing about 98.75 parts by weight of acrylic acid with about 1.25 parts of polyallyl polyether of sucrose having about 5.6 allyl groups per molecule.

EXAMPLE 2

A product like that of Example 1 was formulated, with sodium polyacrylate being added midway, with mixing in the amount stated in Column 1-B of the Table.

My formulation is preferably used at a dilution of about 1:40.

In the Table following, the "Specific Preferred Formulas" represent the preferred embodiments of the invention. Of these two, the formula without sodium polyacrylate is preferred. The "Broad Range Formula" represents ranges of the respective components that give an operable formulation, i.e., one meeting generally the basic characteristics and function of the Preferred Formulation. "Narrow Range Formula" presents more restricted component ranges within "Broad Range Formula", and encompassing "Preferred Formulas". These "Narrow Ranges" use minor modifications of the "Preferred Formulation" with very little resulting change in properties.

In the Table, sodium hydroxide, NaOH, is formulated as a commercial 50% aqueous solution. On a dry basis (or 100% NaOH basis) each value listed for NaOH should be multiplied by 0.5. Similar conversions can be made for the other ingredients given as aqueous solutions, to calculate them to 100% basis or dry basis.

This product uses a water softener system suspended in a base thickened with a modified polyacrylic acid salt and optionally a polyacrylic acid salt. The modified polyacrylic acid salt and the polyacrylic acid salt act as suspending aids to keep the water softener (sodium tripolyphosphate or a variety of other polyphosphate water softeners known to the trade) suspended uniformly for prolonged periods of storage. The said two acid salts also suspend and stabilize the n-alkane sulfonate emulsion.

EXAMPLE 3

In order to make modified polyacrylic acid polymers of the type of Example 1, solution polymerization using the following reaction mixture can be used:

| Raw Material | Parts by Weight |
|---|---|
| Acrylic acid | 98.75 |
| Polyallyl sucrose | 1.25 |
| Azoisobutyronitrile | 1.0 |
| Benzene | 880.0 |

The polymerization is carried out under autogenous pressure at 50° C. until the reaction is complete, which may require 20 hours. The polymer formed is a fine friable powder. The powder, freed from solvent, is in the acid form, and is ready to use. Molecular weight is about 1,000,000. Preferably the product is neutralized with alkali, e.g., NaOH or KOH, to develop its thickening properties in formulations. Such alkali is provided in the formulations in Table 1.

The polyallyl sucrose can be made by the allylation of sucrose. The sucrose is dissolved in concentrated aqueous sodium hydroxide solution, one and one-half equivalent weights of allyl chloride for every hydroxyl group in the sucrose molecule added and the mixture sealed in a reaction autoclave. The autoclave and its contents are heated to 80° to 83° C. for about five hours until no further drop in pressure occurs. The autoclave is cooled and the contents diluted with water until all precipitated salts are dissolved. An organic layer separates out and is isolated and steam distilled. The crude product resulting from steam distillation is then washed with a large volume of water. The wet polyallyl sucrose is then dissolved in toluene, decolorized with "Darco" activated charcoal and dried with sodium sulfate. The toluene is finally removed by distillation under reduced pressure at 100° C. The residue remaining is a polyallyl polyether of sucrose. It has an average of 5.6 allyl groups and 1.97 hydroxyl groups per molecule. The yield is about 91%.

The polymers formed from the reaction of polyallyl sucrose and acrylic acid as in Example 5 of the U.S. Pat. No. 2,798,053 are suitable as the allyl sucrose modified polyacrylic acid component of my composition. That patent is incorporated herein by reference in its entirety. Similar procedures for making the same or substantially the same acrylic-allyl sucrose copolymers are given in U.S. Pat. No. 4,130,501. That patent is likewise incorporated herein by reference in its entirety. Carbopol 941, a modified polyacrylic acid available commercially from B. F. Goodrich, is considered similar to that of Example 2 of my instant specification and is especially suitable.

The above procedure (my Example 3) gives a polyacrylic acid modified by slight cross-linking with polyallyl sucrose. The molecular weight is about 500,000–10,000,000, typically 1,000,000. This material is herein referred to as allyl sucrose modified polyacrylic acid or (for purposes of brevity, e.g., in the Table) simply modified polyacrylic thickening agent.

More comprehensively stated, the modified polyacrylic acid thickening agent can operably be the genus defined as a water dispersible copolymer of an alpha-beta monoolefinically unsaturated lower aliphatic carboxylic acid crosslinked with a polyether of a polyol selected from the class consisting of oligo saccharides, reduced derivatives thereof in which the carbonyl group is converted to an alcohol group, and pentaerythritol, the hydroxyl groups of said polyol which are modified being etherified with allyl groups, said polyol having at least two allyl groups per polyol molecule, water dispersions of which are suitable for use as suspension aids by adjusting the pH to the proper range. Examples of commercially available members of this class of resin are the Carbopol resins, i.e., Carbopol 934, Carbopol 940 and Carbopol 941, manufactured by B. F. Goodrich Chemical Company, Akron, Ohio. Particularly preferred is Carbopol 941. The Carbopol resins can be made by the process of U.S. Pat. No. 2,798,053, above referenced.

Some of the other components of my composition are herein described as follows.

Sodium polyacrylate can have a molecular weight in the range 50,000–200,000. Typically the molecular weight is about 90,000. It is available as PSK-20 from Dearborn Div., Chemed Corp. (Molecular weights herein given are weight average unless otherwise stated.) The sodium polyacrylate is preferably added in liquid form in solution, e.g., in water. I prefer a 20% solution in water. Other monovalent polyacrylic acid salts are also suitable, as are monovalent polymethacrylic acid salts.

The $C_{13-18}$ n-alkane sulfonic acid and salts thereof is a well known surfactant detergent, available commercially as Hostapur SAS-60, a compound of the formula n-alkyl $SO_3R$ where the alkyl group is $C_{13}$–$C_{18}$ and R is Na, K, or H.

As for the polyphosphate, there are several well-known polyphosphates useful as builders in laundry operations, e.g., the alkali metal pyrophosphates, sodium hexametaphosphate, sodium tripolyphoshate, and the like. These are also known as complexing or condensed phosphates. I prefer sodium tripolyphosphates, in powdered form, preferably of the type known in the trade as "high temperature rise" sodium tripolyphosphate.

I claim:

1. A cleaning concentrate consisting essentially of:

| Components | Wt. % |
|---|---|
| Water | 8.5–97.45 |
| water dispersible cross-linked interpolymer of a monomeric mixture comprising a monomeric polymerizable alpha-beta monoolefinically unsaturated lower aliphatic carboxylic acid, and a polyether of a polyol selected from the class consisting of oligo saccharides, reduced derivatives thereof in which the carbonyl group is converted to an alcohol group, and pentaerythritol, the hydroxyl groups of said polyol which are modified being etherified with allyl groups, said polyol having at least two allyl ether groups per polyol molecule | 0.05–2.0 |
| Polyphosphate | 2.–16 |
| NaOH, dry basis | 0.1–12.5 |
| Sodium silicate, dry basis | 0.1–9 |
| Sodium hypochlorite | .05–5.0 |
| $C_{13-18}$ alkane sulfonate, dry basis | .03–9 |
| Sodium polyacrylate, dry basis | 0–2 |

2. Concentrate according to claim 1 consisting essentially of:

| Components | Wt. % |
|---|---|
| Water | 50.6–80.2 |
| Allyl sucrose modified polyacrylic acid made | |

-continued

| Components | Wt. % |
|---|---|
| by co-polymerizing about 98-99.5 parts by weight of acrylic acid with about 0.5-2.0 parts of polyallyl polyether of sucrose having about 4-8 allyl groups per molecule | .3-1.2 |
| Sodium tripolyphosphate, powdered | 4.-12 |
| NaOH, 50% aqueous solution, dry basis | 2.5-10 |
| Sodium silicate, 1:3.22 $Na_2O/SiO_2$, 36% aqueous solution, dry basis | 1.8-7.2 |
| Sodium hypochlorite | 0.5-3.0 |
| $C_{13-18}$ alkane sulfonate, 60% aqueous solution, dry basis | 3.-7.2 |
| Sodium polyacrylate, 20% aqueous solution dry basis | 0.-1.2 |

3. Concentrate according to claim 2 consisting essentially of:

| Components | Amount |
|---|---|
| Water | 56.9 Wt. % |
| Allyl sucrose modified polyacrylic acid made by co-polymerizing about 98.75 parts by weight of acrylic acid with about 1.25 parts of poly allyl polyether of sucrose having about 5.6 allyl groups per molecule | 0.7 |

-continued

| Components | Amount |
|---|---|
| Sodium tripolyphosphate, powder | 8.0 |
| Sodium hydroxide, 50% aqueous solution | 13.0 |
| Sodium silicate, 1:3.22 $Na_2O/SiO_2$, 36% aqueous solution | 12.0 |
| Sodium hypochlorite | 1.4 |
| $C_{13-18}$ n-alkane sulfonate, sodium salt, 60% aqueous soluton | 8.0 |

4. Concentrate according to claim 2 consisting essentially of:

| Components | Amount |
|---|---|
| Water | 51.0 Wt. % |
| Allyl sucrose modified polyacrylic acid made by co-polymerizing about 98.75 parts by weight of acrylic acid with about 1.25 parts of poly allyl polyether of sucrose having about 5.6 allyl groups per molecule | 0.6 |
| Sodium tripolyphosphate, powder | 10. |
| Sodium hydroxide, 50% aqueous solution | 13. |
| Sodium silicate, 1:3.22 $Na_2O/SiO_2$, 36% aqueous solution | 12. |
| Sodium hypochlorite | 1.4 |
| $C_{13-18}$ n-alkane sulfonate, sodium salt, 60% aqueous solution | 8.0 |
| Sodium polyacrylate, 20% aqueous solution | 4.0 |

* * * * *

UNITED STATES PATENT AND TRADEMARK OFFICE

CERTIFICATE OF CORRECTION

PATENT NO. : 4,228,048

DATED : October 14, 1980

INVENTOR(S) : Thomas C. Tesdahl

It is certified that error appears in the above-identified patent and that said Letters Patent is hereby corrected as shown below:

In Column 2, in the Table, line 8, after "Sodium Hydroxide, 50% aqueous", the four entries should be shifted to the right so that they appear in each of the four columns.

Signed and Sealed this

*Ninth* Day of *August 1983*

[SEAL]

*Attest:*

GERALD J. MOSSINGHOFF

*Attesting Officer* *Commissioner of Patents and Trademarks*